United States Patent [19]

Rosaen

[11] Patent Number: 4,825,707

[45] Date of Patent: May 2, 1989

[54] FLUID FLOW INDICATOR INCLUDING A HALL EFFECT TRANSDUCER

[76] Inventor: Lars O. Rosaen, P.O. Box 249, Hazel Park, Mich. 48030

[21] Appl. No.: 914,144

[22] Filed: Oct. 1, 1986

[51] Int. Cl.⁴ .............................................. G01F 1/06
[52] U.S. Cl. ........................... 73/861.77; 73/DIG. 3; 73/861.87
[58] Field of Search .......... 73/861.77, 861.87, 861.78, 73/861.88, 861.75, 861.74, DIG. 3, 861.79, 273

[56] References Cited

U.S. PATENT DOCUMENTS

| | | | |
|---|---|---|---|
| 2,906,121 | 9/1959 | Knauth | 73/861.88 |
| 3,636,767 | 1/1972 | Duffy | 73/DIG. 3 |
| 4,337,655 | 7/1982 | Sundstrom et al. | 73/861.77 |
| 4,461,174 | 7/1984 | Han | 73/861.88 |
| 4,512,201 | 4/1985 | Konrad et al. | 73/861.79 |
| 4,534,227 | 8/1985 | Petit | 73/861.87 |
| 4,565,090 | 1/1986 | Gotanda | 73/861.77 |

FOREIGN PATENT DOCUMENTS

| | | | |
|---|---|---|---|
| 0044963 | 3/1980 | Japan | 73/861.87 |
| 0030614 | 3/1981 | Japan | 73/861.88 |
| 1386580 | 3/1975 | United Kingdom | 73/861.78 |

*Primary Examiner*—Joseph A. Orsino
*Assistant Examiner*—Brent A. Swarthout
*Attorney, Agent, or Firm*—Gifford, Groh, Sheridan, Sprinkle and Dolgorukov

[57] ABSTRACT

An indicator for the rate of volumetric fluid flow includes a housing having a fluid passageway therein and a rotor contained in the housing in a position so as to be rotated by fluid flowing through said passageway. The indicator also includes a Hall effect transducer positioned outside the housing, responsive to the rotation of the rotor. The transducer produces an output signal corresponding to the rate of rotation of the rotor, and thus to the rate of fluid flow through the housing passageway. Preferably, the rotor is a paddle wheel disposed on an axle in the housing. The axle and thus the paddle wheel are retained in the housing by entrapment against a removable housing cover. The housing is otherwise mechanically imperforate to any connection between the rotor and the transducer. The indicator can preferably include a plurality of rotors having different hydraulic characteristics, that is, which rotate at different speeds for a given rate of fluid flow, such that replacement of one rotor for another changes the range of fluid flow rates over which the indicator is responsive.

17 Claims, 1 Drawing Sheet

FLUID FLOW INDICATOR INCLUDING A HALL EFFECT TRANSDUCER

BACKGROUND OF THE INVENTION

I. Field of the Invention

The present invention relates to fluid flow monitors, and more particularly, to a fluid flow rate indicating assembly.

II. Description of the Prior Art

Fluid flow rate indicating assemblies have long been known. Typically, a member responsive to fluid flow is disposed in a housing through which the fluid passes. Flowing fluid impinges on the member, causing it to move. Often, the member is resiliently biased against such motion, so that movement of the member is indicative of the rate of fluid flow. Biasing means commonly employed include gravity or springs. Alternatively, the member can be a rotor, which is mounted on an axle having an end which passes through the housing, and which is connected to a tachometer. The rate of rotation of the rotor, as measured by the tachometer, corresponds to the rate of fluid flow through the housing. The type of indicator including a resiliently biased member also usually includes a shaft or other member passing through the housing, whose position can be correlated to the flow rate.

These known types of fluid flow indicators have encountered some drawbacks, however. Most notably, the perforation of the housing for the passage therethrough of a rotor shaft or other indicating shaft permits fluid leakage between the bore and shaft. This is usually met by disposing a packing about and between the shaft and housing bore. However, such packing is sometimes messy and occasionally unsuccessful. The packing is subject to wear, while the fluid being measured is subject to contamination from the packing material. The cost and difficulty of constructing packing structures which are resistant to high pressures increase as the fluid pressures encountered increase.

SUMMARY OF THE PRESENT INVENTION

The present invention overcomes these and other drawbacks by providing a fluid flow indicator having a housing which, except for a detachable cover, is imperforate. The housing includes a housing portion defining a fluid passageway therethrough. A vaned rotor is contained in the housing in a position so as to be rotated by the impingement of fluid flowing through the passageway on the vanes of the rotor. A Hall effect transducer is positioned outside the housing. The material of the rotor and the construction of the transducer are selected so that the Hall effect transducer is responsive to the rotation of the rotor, and produces an output signal corresponding to a condition of fluid flow through the passageway. Most advantageously, the transducer produces a voltage output corresponding to the rotational rate of the rotor, and thus to the linear flow of fluid through the passageway. Preferably, the indicator comprises a plurality of rotors, only one of the rotors being disposed in the housing at one time, and each of the rotors having hydraulic characteristics distinct from the other rotors. Replacement of one rotor with another thus serves to change the range of flow rates over which the indicator is useful.

In the preferred embodiment of the present invention, the rotor comprises a paddle wheel carried on an axle whose ends are trapped in recesses in the fluid passageway and the housing cover. The axis of the paddle wheel is offset from the axis of the flow passageway, but in projection is disposed perpendicularly to it. Conveniently, the paddle wheel is partly disposed in a cylindrical recess in the housing, so that only one axial end of the paddle wheel is disposed in the fluid passageway. Preferably, the radial length of each of the paddles is on the close order of the diameter of the fluid passageway. The axis of the paddle wheel is thus preferably disposed outside the radial extent of the fluid passageway. A pair of magnets are carried on or preferably in opposing paddles to induce an output signal from the transducer.

BRIEF DESCRIPTION OF THE DRAWING

A better understanding of the present invention will be had upon reference to the following detailed description, when read in conjunction with the accompanying drawing, wherein like reference characters refer to like parts throughout the several views, and in which.

DETAILED DESCRIPTION OF THE PREFERRED EMBODIMENT OF THE PRESENT INVENTION

Figure 1:
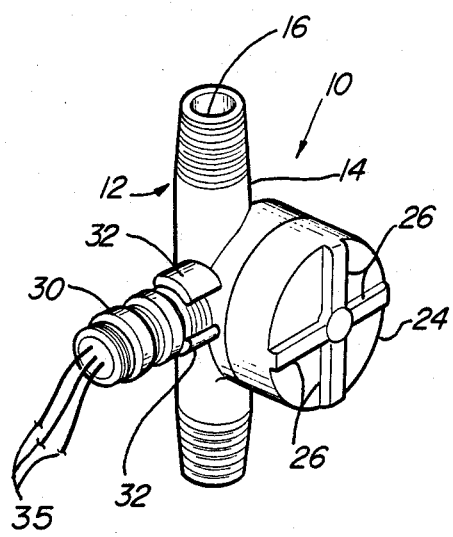
FIG. 1 is a perspective view of the preferred embodiment of the present invention.
Figure 3:
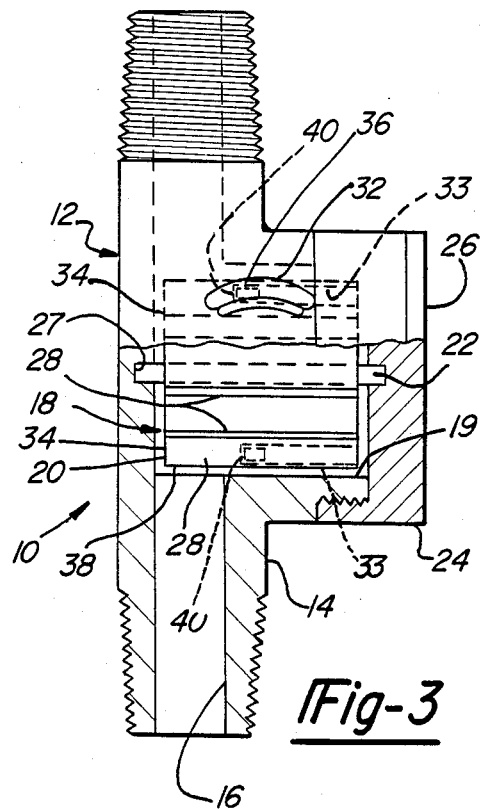
FIG. 3 is a partial cross-sectional view taken along line 3—3 of FIG. 2.

With reference now to the Figures, a fluid flow indicator 10 according to the present invention first comprises a fluid housing 12 having a housing portion or conduit 14 defining a fluid passageway 16 therein. The housing portion 14 is externally threaded for connection to a fluid flow system in a conventional manner.

A vaned rotor 18, preferably a paddle wheel 20, is disposed in a cylindrical recess 19 in the housing 12, in a position such that fluid flowing through the passageway 16 impinges on the rotor 18. Preferably, the paddle wheel 20 is rotatably carried on an axle 22. The axis on which the axle 22 turns is perpendicular but skewed to the axis of the fluid passageway 16, and preferably is positioned outside a tangential extension of the passageway 16. In this manner, fluid directly impinges on the rotor 18 on only one side of the axle 22. The housing 12 includes an imperforate cover 24, and the axle 22 is trapped between the cover 24 and a part 27 of the housing portion 14 opposite the cover 24. Preferably, the axial ends of the axle 22 are insertably received in recesses in the housing portion 14 and the cover 24. The cover 24 is threadably engaged with the housing 12 and is provided with a plurality of flanges 26 for tightening the cover 24 by hand or by other means. A seal (not shown) can be disposed between the cover 24 and the remainder of the housing 12 to aid the prevention of leakage of fluid from the housing 12.

A Hall effect detector 30 is detachably affixed to the outside of the housing 12 by a pair of clips 32. While the particular construction of Hall effect transducers is well known and not specifically the subject of the present invention, the construction of the transducer 30 and the rotor 18 are selected such that the Hall effect transducer is responsive to the rotation of the rotor 18 so as to produce an output signal corresponding to a condition of fluid flow through the passageway 16, preferably corresponding to the rate of rotation of the rotor 18 and thus the volumetric flow of fluid through the passageway 16. The transducer includes a plurality of leads 35 for the supply of current to the detector and the output of a signal to appropriate means (not shown) for converting the signal to a numerical flow rate. It is well known that the Hall effect is the development of a potential difference across a current-carrying conductor when the conductor is introduced into a magnetic field. The potential difference is developed at right angles to both the current flow and to the magnetic field.

Several types of construction of the transducer 30 and the rotor 18 are useful in the present invention. In one construction, the rotor 18 is constructed from a magnetic material, and the transducer 30 includes a current-carrying conductor disposed outside the housing 12, such that the passage of the magnetic rotor vanes near the transducer changes the magnetic field experienced by the conductor, creating the output signal corresponding to a condition of fluid flow. Alternatively, the transducer 30 can include both a current carrying conductor and a magnet, while the rotor 18 is constructed from a ferrous material. Both the magnet and conductor of the transducer 30 are disposed closely adjacent the housing 12, such that the rotation of the rotor causes the rotor vanes to pass near the magnet and conductor and vary the magnetic field experienced by the conductor, resulting in the development of the output signal. Of course, the material from which the housing 12 is constructed should be selected so as not to interfere with the interaction of the rotor 18 and the transducer 30. In particular, the housing 12 should not act as a shield between the rotor 18 and the housing 12.

Most advantageously, the paddle wheel 20 includes a plurality of rectangular paddles 28 which are planar and radially equiangularly disposed about the axis of rotation of the rotor 18. Preferably, the paddles 28 are each coplanar with the axis of rotation of the rotor 18.

Figure 2:
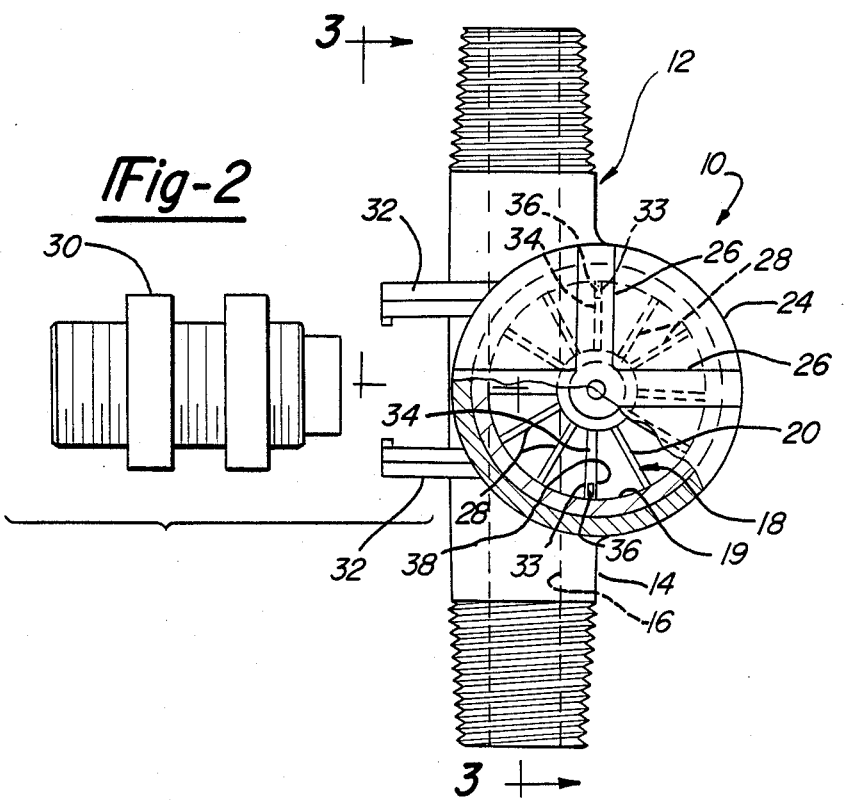
FIG. 2 is a side view of the preferred embodiment of the present invention, with parts removed for clarity.

In the preferred embodiment of the present invention, the paddle wheel 20 is constructed from a plastic or resin which is substantially inert to the fluid passing through the housing 12. As shown in FIG. 2, the paddle wheel 20 comprises twelve symmetrically disposed paddles 28 although it should be apparent that more or fewer paddles would also work as well. An elongated and rectangular recess 33 is formed in one end 38 of each of an opposing pair 34 of the paddles 28. The recesses 33 extend about halfway through the pair of paddles 34, and each frictionally retains a permanent magnet 36 at an inner recess end 40. The magnets 36 are also preferably inert to the fluid passing through the housing 12, although the magnets 36 can alternatively be sealed and retained on the recesses 33 by an inert material. The magnets 36 are preferably oriented so as to maximize the magnetic field changes experienced by the Hall effect transducer 30, and are inserted into the recesses 33 a sufficient distance so that, when rotated, the paths of the magnets 36 are tangential to the center of the transducer 30.

While this is the preferred construction for the rotor 18, it should be appreciated that rotor constructions having a greater or lesser efficiency of reaction to fluid flow are also known. Preferably, the present invention includes a plurality of replaceable rotors 18 having different rotational efficiencies, such that they rotate with different speeds at the same rate of fluid flow. The substitution of one rotor for another in the housing 12 thereby changes the rate at which the magnetic field experienced by the conductor in the transducer 30 changes, thereby changing the range of fluid flow rates which can be measured by an apparatus 10.

The present invention is thus advantageous over the prior art indicators in several ways. The housing is imperforate to mechanical connection or linkage between the transducer and the rotor. The only sources of leakage during normal operation are the cover and the connections to the remainder of the fluid system, and these can generally be sealed to withstand significantly higher pressures than traditional shaft packings, so the leakage encountered in the earlier indicators is avoided. Additionally, the simple construction allows a rapid change of the flow rate range of the indicator, without requiring extensive repacking about the shaft which traditionally perforates the housing. Of course, the range of flow rates over which the detector is operational can also be changed by changing the transducer employed. Changing the rotor, however, is substantially quicker and free of trouble than is changing the transducer, since no electrical connections need to be broken or made.

Having described my invention, however, many modifications thereto will become apparent to those skilled in art to which it pertains, without deviation from the spirit of the present invention, as defined by the scope of the appended claims.

I claim:

1. A fluid flow indicator comprising:
   a housing having a housing portion defining a fluid passageway therethrough;
   a rotor contained in said housing in a position so as to be rotated about an axis of rotation by fluid flowing through said passageway; and
   a hall effect transducer, positioned outside said housing, and being responsive to the rotation of said rotor so as to produce an output signal corresponding to a condition of fluid flow through said passageway;
   wherein said housing further comprises an imperforate detachable cover trappingly retaining said rotor between said imperforate cover and the remainder of said housing
   wherein said indicator further comprises a plurality of interchangeable rotors, each rotor having different hydraulic characteristics one of said rotors being contained one at a time in said housing, such that the range of flow rates over which the indicator is operable is determined by the selection and placement of one of said plurality of rotors in said housing.

2. The invention according to claim 1, wherein said rotor is wholly contained in said housing.

3. The invention according to claim 1, wherein each said rotor is carried on an axle disposed in said housing, and each said rotor and said axle are wholly contained in said housing.

4. The invention according to claim 1, wherein each said rotor comprises a paddle wheel.

5. The invention according to claim 4, wherein each said paddle wheel is carried on an axle disposed in said housing.

6. The invention according to claim 5, wherein said axle is skew but perpendicular to the axis of said passageway.

7. The invention according to claim 6, wherein one end of each said paddle wheel is disposed in said passageway.

8. The invention according to claim 1, wherein each said rotor comprises a ferrous material.

9. The invention according to claim 1, wherein each said rotor comprises a magnetic material.

10. The invention according to claim 1, wherein each said rotor has an axis of rotation and comprises a plurality of radially equiangularly disposed planar vanes, each of said vanes being coplanar with said axis of rotation of its rotor.

11. The invention according to claim 10, wherein said vanes are rectangular.

12. The invention according to claim 1, wherein said housing is imperforate to mechanical connection between said rotor and said Hall effect transducer.

13. The invention according to claim 1, wherein each said rotor comprises a material nonreactive to the fluid whose flow said indicator measures.

14. The invention according to claim 1, wherein at least one of said rotors is made of a plastic material.

15. The invention according to claim 1, wherein said rotor comprises at least one permanent magnet.

16. The invention according to claim 1, wherein at least one of said rotors is made of a resin material.

17. The invention according to claim 1, wherein said imperforate cover is spaced from said passageway in the direction of said axis of rotation of said rotor.

* * * * *